United States Patent [19]

Cross

[11] Patent Number: 4,777,338

[45] Date of Patent: Oct. 11, 1988

[54] PERFORATION OF SYNTHETIC PLASTIC FILMS

[76] Inventor: James D. Cross, 41 Allen Street East, Waterloo, Ontario, Canada, N2J 1J1

[21] Appl. No.: 36,096

[22] Filed: Apr. 8, 1987

[51] Int. Cl.[4] .......................... H05B 7/18; B29D 7/01; H01G 4/28

[52] U.S. Cl. .................................. 219/69 R; 204/168; 219/384; 264/22; 264/154; 361/303

[58] Field of Search ................ 361/303; 219/383, 384, 219/68, 690, 69 R, 69 M; 264/22, 80, 154, 156, 27; 346/162, 163, 164; 204/168, 169

[56] References Cited

U.S. PATENT DOCUMENTS

| | | | |
|---|---|---|---|
| 2,513,838 | 7/1950 | Beall | 219/384 |
| 2,785,280 | 3/1957 | Eisler et al. | 219/69 M |
| 3,502,845 | 3/1970 | Schirmer | 219/384 |
| 3,665,157 | 5/1972 | Harada | 219/384 |
| 3,802,396 | 1/1975 | Machida et al. | 219/384 |
| 4,261,806 | 4/1981 | Asai et al. | 204/168 |
| 4,303,733 | 12/1981 | Bulle et al. | 361/303 |
| 4,314,142 | 2/1982 | Brown et al. | 219/384 |
| 4,487,671 | 12/1984 | McGeough | 219/69 M |
| 4,488,030 | 12/1984 | Cross | 219/69 R |
| 4,534,994 | 8/1985 | Feld et al. | 219/384 X |
| 4,578,556 | 3/1986 | Inoue | 219/69 M |
| 4,584,450 | 4/1986 | Inoue | 219/69 M |
| 4,626,332 | 12/1986 | Inoue | 219/69 D |
| 4,628,170 | 12/1986 | Furukawa | 219/69 D |

FOREIGN PATENT DOCUMENTS

| | | | |
|---|---|---|---|
| 2145048 | 5/1980 | Fed. Rep. of Germany | 219/384 |
| 56-76347 | 6/1981 | Japan | 219/69 D |
| 667532 | 3/1952 | United Kingdom | 361/303 |

*Primary Examiner*—A. D. Pellinen
*Assistant Examiner*—Geoffrey S. Evans
*Attorney, Agent, or Firm*—Ridout & Maybee

[57] ABSTRACT

Spark perforation of synthetic plastic film is carried out by applying electrodes to opposite ends of a portion of the film submerged in a water bath that is at a temperature above the onset temperature of glass transition of the film,and applying short fast rise time electrical pulses of an amplitude sufficient to ensure dielectric breakdown of the film. The size of the perforations formed can be controlled by altering the temperature of the water bath. By using short fast pulses, energy consumption, film decomposition and electrode erosion are minimized, and the high dielectric strength of water can be exploited to control perforation while its conductivity can be exploited to remove residual electric charges from the film. Capacitors formed by lengths of coaxial cable are used by a pulse generator for generating pulses having rise times less than one microsecond.

3 Claims, 2 Drawing Sheets

PERFORATION OF SYNTHETIC PLASTIC FILMS

Figure 1:
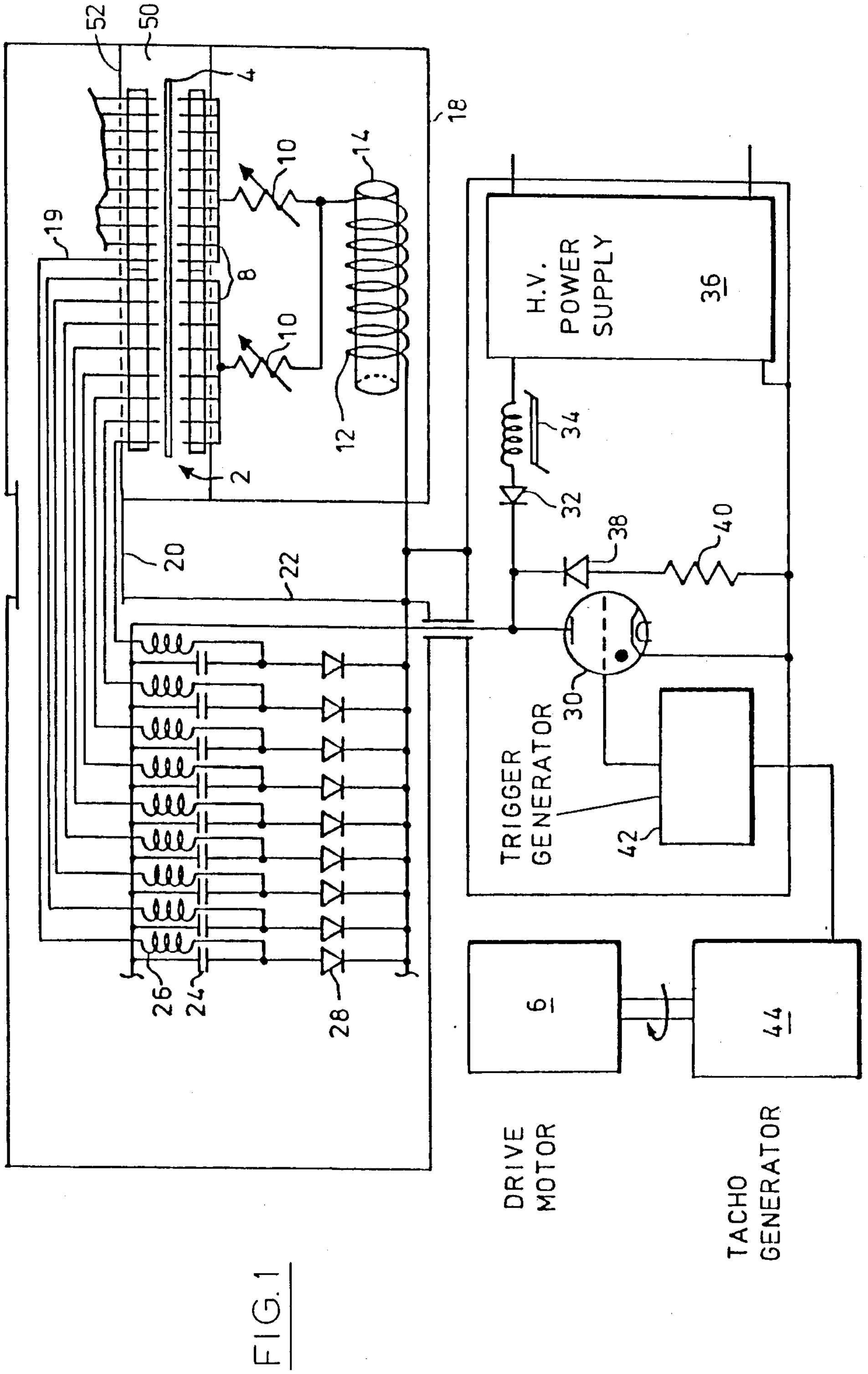

This invention relates to the production of perforated synthetic plastic films.

In my U.S. Pat. No. 4,488,030, I describe electrical spark treatment apparatus for forming multiple perforations in thin sheets of materials. The apparatus was developed primarily for the perforation of paper, a particular application being the perforation of paper utilized in the manufacture of cigarettes. Whilst the performance of the apparatus in the perforation of paper has proved very satisfactory, I have found that, in common with other spark perforation machines, its performance is much less satisfactory when applied to the perforation of typical synthetic plastic films, which are usually characterized by a very high dielectric strength and thermoplastic properties. When perforating paper, I have found that the paper has little influence upon the breakdown potential of the spark gap and that the size of the hole formed is dependent upon the energy of the discharges. When perforating the plastic film, the minimum spacing between the holes which can be achieved is increased by a tendency of the spark discharges to move laterally over the surface of the film to reach previously formed perforations or weak spots in the film, whilst the edges of the perforations tend to melt back from the discharge thus enlarging the size of the perforations. The resulting perforations tend to be irregularly spaced and much larger than desired. The size of the perforations depends upon the number of discharges that pass through each hole and it can reach 1 mm. If weak spots are absent in films such as 1 mil polyethylene, know spark apparatus used for perforating paper will not produce any perforation of the polyethylene. For many applications a diameter of about 40 microns or less would be desirable, because a film so perforated remains waterproof, whilst allowing "breathing" of materials within the film. Such a waterproof but gas permeable film has many potential applications in the clothing, food packaging, medical and other fields.

Further problems which arise with the spark perforation of synthetic plastic films are energy consumption, which must be kept to a minimum to render the process economic, and the possible generation of toxic substances by the decomposition of the material of the film or other materials utilized in the process.

U.S. Pat. No. 2,513,838, issued July 4, 1950 to H. W. Beall, discloses the spark perforation of a plastic film utilizing a bath of oil or other non-conductive fluid of high dielectric strength. By this means perforations can be formed closer together than would be the case if the oil were absent, since the high dielectric strength of the latter means that perforation occurs in the concentrated electrical field immediately between the electrodes. The bath is also said to suppress burning of the material, which could well be a problem with the particular arrangement utilized by Beall in which it is apparently contemplated that arcing will occur between relatively movable electrodes, such as fingers moving over a patterned drum, the arc being started and terminated as the portions of the electrodes move into and out of sufficient proximity. The arcs are thus presumably sustained over a significant interval. From a present day perspective, the Beall process presents two significant problems. Firstly, the energy consumption is likely to be unacceptably high. Secondly, known insulating and transformer oils will themselves produce decomposition products when subjected to spark discharges which may or may not be harmless, and in any event it will normally be necessary to remove residues of the oil from the film. It is also admitted that some burning of the film itself is likely to occur which, dependent on the composition of the film, may produce toxic byproducts. Even films formed from polymers which themselves produce relatively harmless decomposition products commonly contain plasticizers which may produce toxic byproducts on decomposition. Despite the description of the size of the holes produced as "practically insensible", I suspect that the results would be essentially the same as those discussed above. Since various alternative methods are known for perforating plastic films with holes down to about 100 microns, the problems and expense associated with spark perforation processes render their application of limited attraction, and to the best of my knowledge such processes are not used commercially for the production of perforated synthetic plastic films.

U.S. Pat. No. 3,502,845 (Schirmer) describes a technique for perforating films by electrical discharge, using dielectric net or specially shaped electrodes. The specification is silent as to the actual size of holes produced. Although there is clearly some error in the voltage and current figures quoted, since even the minimum preferred figures imply a power consumption of 500 kilowatts, it appears that power consumption would be substantial.

U.S. Pat. No. 4,314,142 (Brown et al) describes an electrostatic perforator said to be suitable for the perforation of paper, film and like materials, but there is no disclosure of its performance specifically in relation to "film", and the invention is primarily concerned with means for maintaining porosity control.

U.S. Pat. No. 3,862,396 (Machida et al) discusses some of the problems associated with spark perforation techniques, and controls arcing by the use of air jets associated with the electrodes. In the perforation of soft polyvinyl chloride of 300 micron thickness, an increased perforation density and a hole size of 50–100 microns was attained. Although this technique is apparently effective in reducing hole size and spacing, still further reduction would be desirable, and the electrode structure is necessarily rather complex.

U.S. Pat. No. 4,534,994 (Feld et al) relates to a technique for forming fine perforations in plastic or rubber sheet materials by laminating a thin film to a mechanically perforated sheet, and then spark perforating the film adjacent the perforation in the backing sheet. There is no disclosure of the size of perforations produced, nor of the exact technique used to produce them, although the claim that the material is waterproof implies that they are 40 microns or less. There is an implication that the film is very thin and flimsy, the main strength residing in the backing layer. If the film is thin enough and sufficiently well supported, then it may be that very small spark perforations can be produced, but the laminated structure disclosed by the patent would be too costly for many of the potential applications of such material. A further rather similar technique is disclosed in U.S. Pat. No. 3,665,157 (Harada).

I have now found that it is possible to produce spark perforated synthetic plastic film having perforations of reduced size and closer spacing, whilst economizing both on the electrical consumption and cost of the perforation equipment, whilst reducing the possibiliy of generating harmful byproducts, and without the use of materials such as oil which are hard to remove from the film.

In short, I have ascertained that if the film is submerged in water during the perforation process, the water forms a highly satisfactory dielectric medium, provided that the rise time of an applied electrical pulse causing dielectric breakdown of the film to be perforated is sufficiently short (less than about 1 microsecond). Although the dielectric strength of the water under these circumstances is very high, it also has appreciable conductivity, such that residual charges on the film leak away rapidly after perforation and do not interfere with the formation of subsequent perforations. Furthermore, residual water is readily removed from the film by evaporation, it does not form toxic fumes or byproducts, and it is cheap and readily available.

I have further found that when film is perforated in this manner, the size of perforation produced in synthetic plastic film is not heavily dependent upon the duration of the discharge. Once dielectric breakdown of the film has occurred the resultant discharge need not be further sustained. In other words, very short discharge pulses can be utilized, which both greatly reduces the consumption of electricity, and decreases the capacity and thus cost of energy storage devices utilized in apparatus utilized to generate the pulses. Furthermore, with very short pulses, the perforation of the film upon dielectric breakdown is substantially due to physical disruption, and there is rapid cessation of the arcing which minimizes both decomposition of the film material and erosion of the electrodes. The use of very short pulses with fast rise times is also very desirable when water is utilized as a dielectric medium in order to minimize losses due to conductivity of the water prior to breakdown of the film.

Finally, I have found that when film is perforated whilst submerged in water, the size of the perforations can be controlled over a substantial range by varying the temperature of the water, high temperatures resulting in smaller holes, although for this effect the temperature should be raised above the onset of glass transition of the plastic forming the film. With a number of widely used films, particularly polyethylene, perforations of a diameter of 40 microns or less can be obtained merely by heating the water, even in material of about 1 mil thickness.

Accordingly, the invention provides a method for perforating plastic film comprising moving film to be perforated through a water bath, positioning electrodes adjacent opposite side of the film in that bath, and applying a pulsed electrical potential between the electrodes of an amplitude sufficient to cause dielectric breakdown of the film, the rise time of the pulse being sufficiently rapid to prevent substantial losses due to conductivity of the water.

Preferably the energy content of the pulse is not substantially greater than required to ensure dielectric breakdown of the film, thus limiting waste of energy, chemical decomposition of the film material, and erosion of the electrodes. Preferably the water bath is at a temperature above the onset temperature of glass transition of the film material and selected to provide a desired perforation diameter.

The invention extends to apparatus for carrying out the method.

Figure 2:
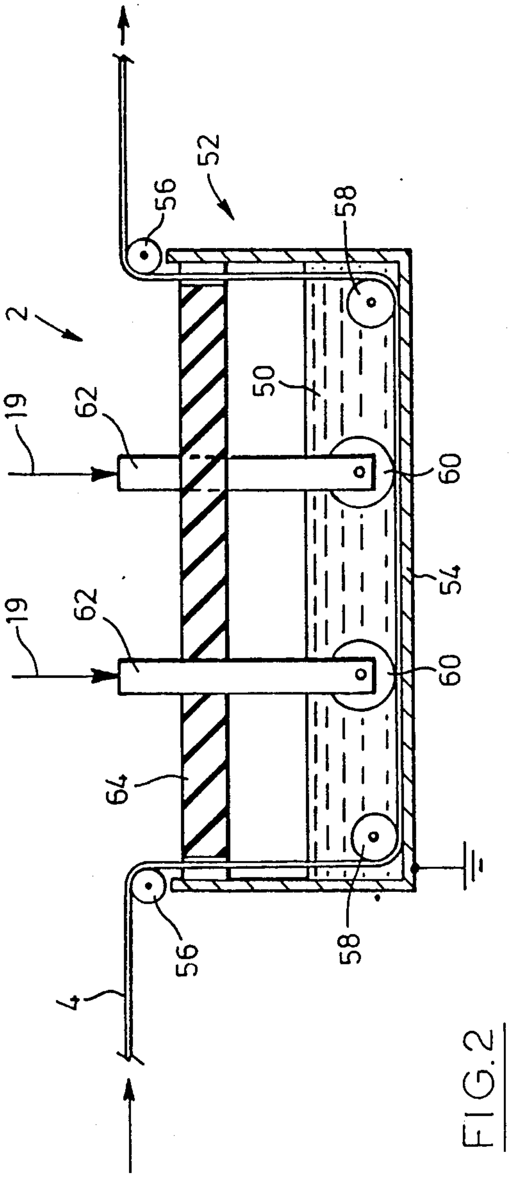

Further features of the invention will be apparent from the following description with reference to the accompanying drawings, in which:

FIG. 1 schematically illustrates apparatus for carrying out the method of the invention; and FIG. 2 illustrates a presently preferred electrode arrangement.

Referring to the drawings, FIG. 1 is substantially identical to the sole FIGURE of U.S. Pat. No. 4,488,030, the disclosure of which is incorporated herein by reference, except that the electrode array 2 is shown schematically located in a bath of water 50 housed in a chamber 52 within the enclosure 18. Some changes in components need however to be noted. In general, higher potentials will be required for perforating plastic film than paper, although for reasons discussed elsewhere, power consumption may be reduced: the power supply 36 will therefore be constructed accordingly and other components rated to withstand the high potentials involved. The required capacitance of the capacitors 24 is greatly reduced, since only enough energy need be stored to provide reliable development of breakdown potentials across the electrodes in the array 2. In practice the capacity required can be provided very economically by capacitors formed from relatively short lengths of high voltage coaxial cable. The inductors 26 will also be reduced in value and may in some cases be formed merely by the inductance or resistance of connecting wiring. The inductor 12 and resistors 10 may be reduced or eliminated. In the present case desired to achieve a fast rise time and to minimize the time for which the spark is maintained once dielectric breakdown occurs, although some inductance is required to maintain proper energy distribution between multiple spark electrodes and keep high frequency electromagnetic radiation from the apparatus down to acceptable levels. The use of the water bath 50 provides a convenient way of removing heat generated by the spark discharges between the electrodes, and the rate of water flow through the bath may be regulated to maintain a desired temperature.

In practice, utilizing typical packaging films such as polyethylene or polypropylene film, a power supply potential of about 15,000 volts per mil of film thickness will be appropriate, and the capacitors 24 may have a capacity of the order of 20 pf, readily provided by quite short lengths of coaxial cable of adequate voltage rating. In view of the high potentials and fast rise times required, a thyratron remains the control element of choice in the pulse generator, in preference to semiconductor devices.

In use of the apparatus, the drive motor 6 is utilized to advance film through the water 50 between the electrodes, which should be closely adjacent the film surface because of the high dielectric strength of the water under pulse conditions. A preferred electrode assembly is shown in FIG. 2, sectioned in a vertical plane parallel to the longitudinal axis of the film. The lower electrodes are formed by the bottom 54 of a grounded metal tank forming the chamber 52, and the film 4 is constrained to pass across the bottom of the tank by guide rollers 56, 58. The upper electrodes are formed by discs 60 freely rotatable on pivots in conductive vertical support rods 62 connected to the conductors 19 (see FIG. 1), the rods 62 passing through an insulating support 64 which connects them into an assembly which stands on the bottom 54 of the tank with the discs pressing the film against the latter. This arrangement means that the dielectric strength of the gap between the electrodes is essentially that of the film 4 without any significant increase due to the water. In order to maintain uniform pressure on the discs, each may be connected independently to the support 64 by a spring. To obtain a close lateral spacing of rows of holes, the rods 62 may be arranged in staggered rows, as shown.

The generator 44 drives the trigger generator 42 so as to trigger the thyratron 30 at an appropriate repetition frequency according to the perforation spacing required.

Because of the high dielectric strength of both the water and the film, and the discharge of residual charges after perforation by the conductivity of the water, perforations can be closely spaced without mutual interference. The lower plates of capacitors 24 are charged to the supply potential when the thyratron is in the off state, and are rapidly discharged to near ground potential each time it is triggered into the on state. Simultaneously an opposite potential appears on the upper plates of the capacitors, and the further capacitors formed by the film and the water are charged at a rate limited only by the inductance and resistance in series with them. When dielectric breakdown occurs in the capacitors formed by the spark gaps, the discharge release of stored energy disrupts and perforates the film, whilst setting up a spark discharge and the remaining stored energy from the capacitors 24 is rapidly discharged through the relatively low resistance path provided by the discharge, at a rate again regulated by the series inductance and resistance. The component values utilized in the spark circuits are selected to provide a rise time of the potentials across the spark gaps which is fast enough that no substantial leakage occurs through the water, which has excellent dielectric properties for so long as potentials are sustained no longer than about a microsecond. The rise time is thus preferably less than one microsecond. Even with close perforation spacings, however, the intervals between discharges will be long enough for the conductivity of the water to dissipate residual charges remaining on the surfaces of the film after a discharge, thus avoiding interference with subsequent discharges.

Heat energy produced during perforation is absorbed by the water, the temperature of which is also utilized to control the size of the perforations produced. For example, utilizing typical 1 mil polyethylene packaging film, it is found that perforation size reduces from about 100 microns to about 50 microns as the water temperature is increased from 20° C. to 50° C., and to 40 microns and below as the temperature is further increased. On the other hand, the perforation size is relatively insensitive to the total energy of the discharge, provided that initial dielectric breakdown has been attained. A minimization of discharge energy is thus desirable from the point of view both of economy in operation and construction of the apparatus, and the capacitors 24 need be no larger than will allow rapid charging to breakdown potential of the capacitors formed by the spark gaps, water and film, over the range of film characteristics and thicknesses for which the apparatus is designed. Both the water bath and the low discharge energy contribute to minimization of burning and other undesirable chemical decomposition of the film material.

On leaving the tank 52, any residual moisture can readily be removed from the film by evaporation without producing harmful fumes or residues.

I claim:

1. A method for perforating plastic film, comprising moving film to be perforated through a water bath, positioning electrodes adjacent opposite sides of the film in that bath, and applying high potential electrical pulses across the electrodes of an amplitude sufficient to cause dielectric breakdown of the film, the rise time of the pulses being sufficiently rapid to prevent substantial losses due to conductivity of the water, the water bath being at a temperature above the onset temperature of glass transition of the film material and selected to provide a desired perforation diameter.

2. A method according to claim 1, wherein the energy of each pulse is not substantially greater than required to ensure dielectric breakdown of the film.

3. A method according to claim 1, wherein the rise time of the pulses is less than one microsecond.

* * * * *